Oct. 22, 1946.  D. DEAN  2,409,976
MASKING COLOR TRANSPARENCIES IN MOUNTS
Filed July 13, 1945

DAVID DEAN
*INVENTOR*
BY
*ATTORNEYS*

Patented Oct. 22, 1946

2,409,976

UNITED STATES PATENT OFFICE 2,409,976

MASKING COLOR TRANSPARENCIES IN MOUNTS

David Dean, Rochester, N. Y., assignor to Eastman Kodak Company, Rochester, N. Y., a corporation of New Jersey Application July 13, 1945, Serial No. 604,761

3 Claims. (Cl. 95—2)

This invention relates to photography and particularly to a method for masking color transparencies in mounts.

Photographic color transparencies are frequently mounted in cardboard, synthetic plastic or metal mounts having a central opening so that the transparency may be viewed in a still projector or viewer while contained in the mount. The central opening in the mount provides a recess so that the transparency lies below the outer surface of the mount.

In making prints or duplicates of the transparency, it is desirable to use a mask having an image thereon for correction of the color and tone of the original image. This mask must be registered with the color image during the printing exposure. This necessitates removing the transparency from the mount with the attendant disadvantages of expense and possible damage to the transparency, or providing some means for registering the masking film with the transparency while in the mount. Such registering means are not readily available or have not proven successful in practice.

It is therefore an object of the present invention to provide a simple and inexpensive technique for masking a color transparency while retained in its mount. Other objects will appear from the following description of my invention.

The principal object and other objects of the invention are accomplished by providing a registration patch of substantially the exact size of the opening in the mount, one side of the patch being in contact with a light-sensitive material, and exposing the light-sensitive material while the patch is registered in the opening in the mount. This permits processing of the sensitive material and re-registration if necessary in the opening in the mount so that the printing exposure may be made with the masking image in register with the original transparency.

Figure 1:
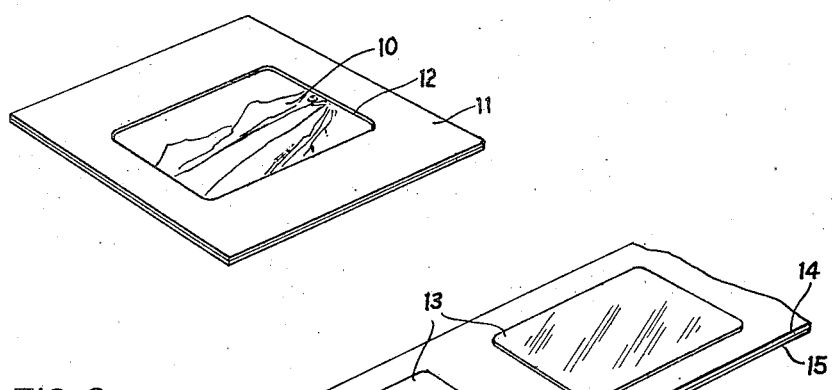
Figure 2:
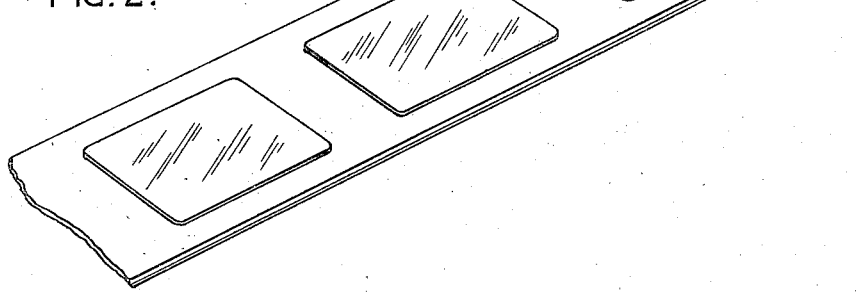
Figure 3:
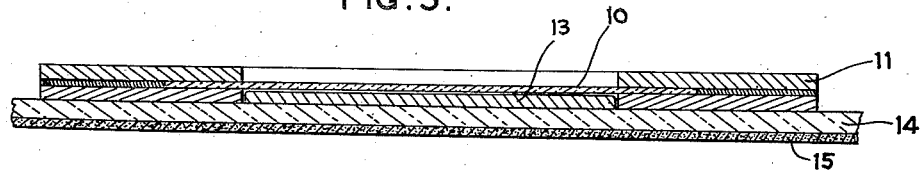

In the accompanying drawing,

Fig. 1 is a perspective view of a color transparency in its mount and Fig. 2 is a perspective view of a portion of the masking material used according to my invention. Fig. 3 is a cross-section view of the combined color transparency and masking material.

Fig. 1 shows a color transparency such as a multi-color transparency on 35-mm. film as it is usually mounted for viewing in a projector. The mounted transparency consists of the picture or transparency 10 in the mount 11, which is generally two pieces of cardboard cemented together so that the transparency may be viewed through the central opening in the mount. The mount thereby provides a recessed portion as shown at 12 so that the edges of the mount extend above and beyond the transparency 10.

As shown in Fig. 2, the masking means of my invention consists in the use of registration patches 13 of transparent material such as clear acetate sheeting about 0.015 inch thick. These registration patches are of substantially the exact size as the central opening in the mount 11 so that they just fit in the recessed portion 12 of the mount. The patches 13 are cemented to the back of a photographic film such as an unperforated 35-mm. film having sensitive layer 15 on the opposite side thereof. The masking film 14 may be of any suitable dimensions and may be perforated if desired. Other layers customary in the art such as subbing and overcoating layers may also be present.

For the masking exposure, and as shown in Fig. 3, the transparency in its mount is centered in the exposing gate of suitable exposure apparatus and the registration patch 13 of the masking film is placed in the central opening of the mount. With the films in this position an exposure is made with light passing through the color transparency onto the emulsion of the masking film. The mounting transparency is then removed from the masking film which is developed, fixed, washed and dried in the usual manner.

The masks are then returned to their position on the transparency. The registration patch 13 permits exact registration of the masking image in layer 15 with the color transparency 10. While in this position the mask and the original transparency are in register and are then printed in combination onto the printing or duplicating material. After printing the mask may be discarded or it may be cut from the masking film together with the corresponding registration patch and retained with the transparency for further use if desired.

The masking exposure may be made in any suitable way with light of various colors suitable for masking, all as well known in the art.

It is also possible to punch the registration patch from a piece of sensitive transparent film and to mount this film directly in the opening in the mount, with the emulsion outermost or away from the transparency. Prior to mounting the sensitive registration patch in the opening of the transparency mount, the emulsion is placed in a solution of developing agent so that developer is introduced into the unexposed emulsion. The patch is then registered in the opening in the mount and is exposed in the usual way through the transparency. The exposed emulsion is then developed by treatment with alkaline vapors such as ammonia and the developing action stopped by treatment with an acid vapor such as acetic acid vapor. This avoids removal of the registration patch and the emulsion from the mount for development of the masking image. The printing exposure may then be made without removing the mask from the transparency mount. Development of an emulsion by vapor treatment is described in Fierke and Staud U. S. patent application Ser. No. 500,923, filed September 2, 1943, and in Yackel, Leermakers and Staud U. S. patent application Ser. No. 500,924, filed September 2, 1943, now Patent No. 2,388,894.

It will be understood that my invention is susceptible of variations not herein specifically described and that the scope of my invention is coextensive with the scope of the appended claims.

I claim:

1. The method of masking a multi-color transparency secured in a mount having a central opening through which the transparency may be viewed, the edges of the mount projecting beyond and above the transparency, which comprises providing a transparent, rigid patch of substantially the exact size as the opening in said mount, one side of said patch being in contact with a light-sensitive layer, registering said patch in the opening in said mount with the sensitive side outermost, exposing said light-sensitive layer through said transparency, and thereafter forming a masking image therein and exposing the combination of transparency and masking image onto a print material.

2. The method of masking a multi-color transparency secured in a mount having a central opening through which the transparency may be viewed, the edges of the mount projecting beyond and above the transparency, which comprises providing a transparent, rigid patch of substantially the exact size as the opening in said mount, securing said transparent patch to the back of a transparent, sensitive photographic film at least as large as the opening in said mount, registering said patch in the opening in said mount, exposing said sensitive material through said transparency with the patch in registration, removing said exposed material from said transparency and developing an image therein, again registering said patch in said transparency mount, and exposing the combination of transparency and developed image onto a print material.

3. The method of masking a multi-color transparency secured in a mount having a central opening through which the transparency may be viewed, the edges of the mount projecting beyond and above the transparency, which comprises providing a transparent cellulose ester patch of substantially the exact size as the opening in said mount, securing said transparent patch to the back of a transparent photographic film at least as large as the opening in said mount and having a silver halide emulsion on the opposite side thereof, registering said patch in the opening in said mount, exposing said emulsion through said transparency with the patch in registration, removing said exposed material from said transparency and developing a silver image therein, again registering said patch in said transparency mount and exposing the combination of transparency and developed image onto a multi-layer print material.

DAVID DEAN.